United States Patent [19]
Zadiraka

[11] 4,289,114
[45] Sep. 15, 1981

[54] CONTROL SYSTEM FOR A SOLAR STEAM GENERATOR

[75] Inventor: Allan J. Zadiraka, Akron, Ohio

[73] Assignee: The Babcock & Wilcox Company, New Orleans, La.

[21] Appl. No.: 941,700

[22] Filed: Sep. 12, 1978

[51] Int. Cl.³ .......................... F24J 3/02; F03G 7/02; F22G 5/12

[52] U.S. Cl. .................... 126/421; 126/422; 126/432; 60/641.8; 122/487

[58] Field of Search ............... 126/422, 423, 432, 433, 126/450, 452, 438, 400; 60/641; 122/473, 486, 487

[56] References Cited

U.S. PATENT DOCUMENTS

| | | | |
|---|---|---|---|
| 1,162,505 | 11/1915 | Nichols | 126/438 |
| 1,814,897 | 7/1931 | Coxe | 126/438 |
| 4,054,124 | 10/1977 | Knoos | 126/422 |
| 4,125,107 | 11/1978 | Nurnberg | 126/400 |
| 4,129,120 | 12/1978 | Saunders | 126/422 |

OTHER PUBLICATIONS

Babcock & Wilcox, "Steam: its Generation and Use", 1972, pp. 12-19, 12-20 and 35-1 through 35-8.

Primary Examiner—Samuel Scott
Attorney, Agent, or Firm—Vytas R. Matas; Joseph M. Maguire

[57] ABSTRACT

A once-through solar steam generator assembly (16) is controlled by a control system wherein the outlet temperature of superheated steam from two independent boiler flow paths (1-12; 1'-12') is independently controlled to a common set point by a combination of water spray attemperation (32) at the primary superheater outlet (34, 36; 34', 36') of each flow path (1-12; 1'-12') and the control of feedwater flow through the independent flow paths (1-12; 1'-12').

4 Claims, 9 Drawing Figures

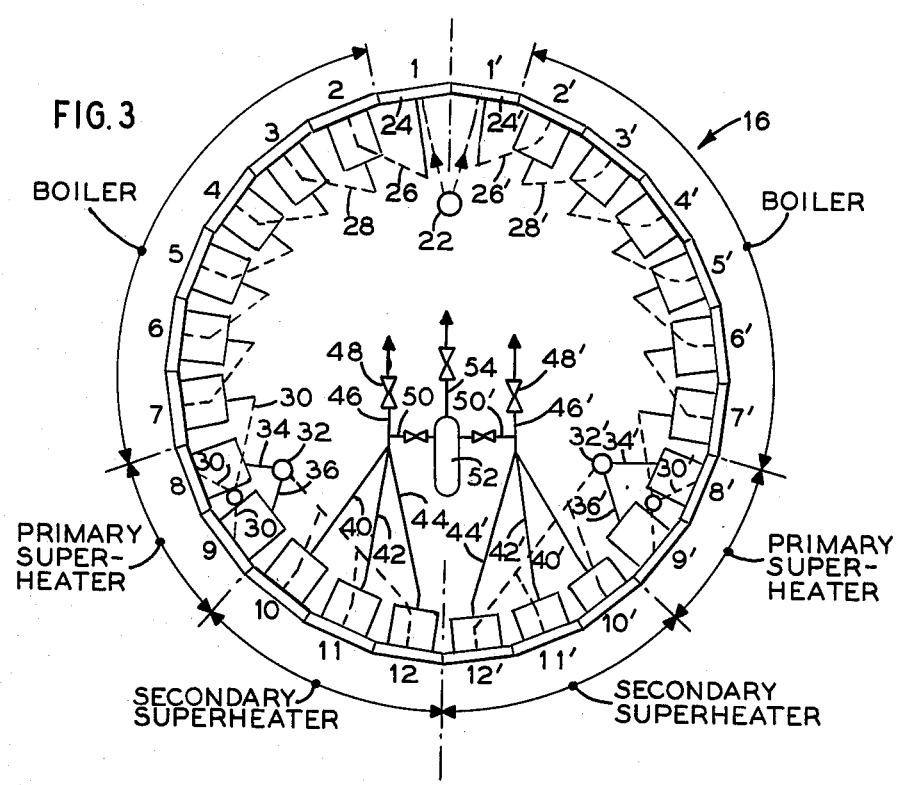
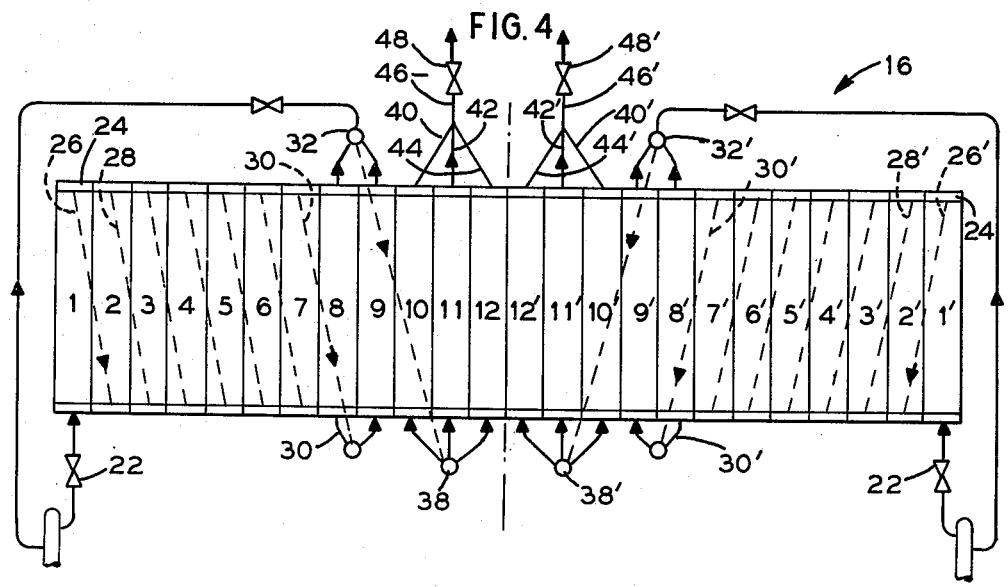

CONTROL SYSTEM FOR A SOLAR STEAM GENERATOR

TECHNICAL FIELD

The present invention relates to control systems generally and in particular to control systems for solar-powered steam generators.

BACKGROUND ART

Although it is known to utilize solar panels heated by solar radiation to heat up water passing through the panels to a storage tank or heat sink which heat sink is then controllably used to heat homes, etc., these particular types of applications did not require an accurate control system for producing steam generation.

In recent years with the rising cost of energy, the use of solar-heated panels to run a steam generator which would produce steam in sufficient quantity and temperature to run a turbine was investigated. In such known solar steam generators the feedwater was applied to each individual panel of the solar steam generator in a parallel manner with the only control being the control of flow through each individual panel to insure that steam would be produced at the outlet of each panel. The outlet of each panel would then be sent to some main header which would pipe the steam to the turbine. As such, this type of control system was quite rudimentary and did not lend itself to use in conjunction with modern turbines.

SUMMARY OF THE INVENTION

The present invention solves the problems associated with the known prior art devices as well as others by providing a control system for a once-through solar-heated boiler wherein feedwater is passed through a series of solar panels which heat the feedwater up to the superheated steam level. The temperature of the steam at this superheated steam level is sensed and attemperation is provided to control the steam temperature exiting therefrom to a secondary superheater series of panels. The temperature of the steam exhausting from the secondary superheater panels is sensed and the flow of the feedwater is manipulated to insure that steam of the desired temperature is supplied to the turbine.

In a particular embodiment of the present invention, the signals of temperature outlet from both the first series of panels providing initially superheated steam as well as the outlet of the steam from the secondary superheater panels are used to control the amount of attemperation into the secondary superheater panels.

In view of the foregoing, it will be seen that one aspect of the present invention is to provide a control system for a once-through solar-heated boiler.

Yet another aspect of the present invention is to provide a control system for a solar-heated boiler wherein both feedwater flow and attemperation are controlled to provide desired steam output from the solar boiler.

These and other objects of the present invention will be more clearly understood from a review of the following description of the preferred embodiment of the invention when considered in conjunction with the drawings.

BRIEF DESCRIPTION OF THE DRAWINGS

FIG. 3 is a schematic top view of the solar panels of FIG. 2.

FIG. 4 is a schematic side view of the panels of FIG. 3 with all the panels laid out in a single plane.

DESCRIPTION OF THE PREFERRED EMBODIMENT

Figure 1:
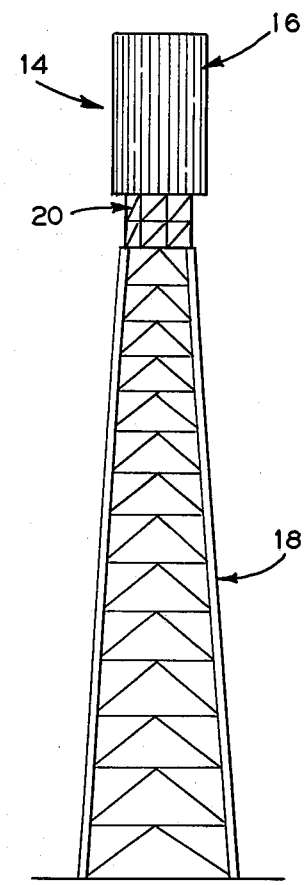
FIG. 1 is a schematic side view of a solar steam generator tower.
Figure 2:
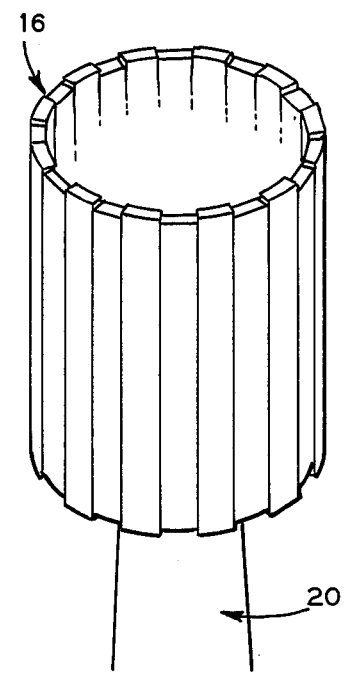
FIG. 2 is an expanded isometric view of the solar panel structure of the FIG. 1 solar steam generator tower.

Referring now to FIGS. 1 and 2, a solar steam generator tower 14 is shown having a cylindrical solar steam generator assembly 16 mounted to a strutted support structure assembly 18 through a water riser assembly 20. The support structure assembly 18 is approximately 65 meters high with the water riser assembly adding another 8.75 meters to the total height from which the solar steam generator assembly 16 is mounted.

The solar steam generator assembly 16 is substantially cylindrical in shape having a 7 meter diameter and a 12.5 meter height. The circumference of the solar steam generator assembly 16 is composed of a series of solar panels which are supported on a frame and having connections for fluid flow through the panel at both the top and the bottom of each panel.

Turning now to FIGS. 3 and 4, it will be seen that the solar steam generator assembly 16 has two separately controlled parallel flow paths, each comprising panels 1-12 and 1'-12'. Each panel is approximately 1 meter wide and 12.5 meters high. The panels and are supported on a frame (not shown) shaped as a 24-sided polygon. Solar energy is absorbed on the external surface of each panel. As was mentioned, the two flow paths will be from panels 1-12 and through panels 1'-12'. The two flow paths are substantially identical and the primed and unprimed numbers will refer to the same elements in each separate flow path.

Feedwater is supplied to the two separate flow paths at the bottom panels 1 and 1' which are located in the highest heat flux zone; namely, in the northern direction. Thus, the panels 1 and 1' act as a preheater to initially heat the feedwater. The feedwater is supplied to the panels 1 and 1' through a control valve 22 which supplies feedwater to the bottom of panels 1 and 1'. The water is preheated in the tubes of panels 1 and 1' and is collected in an upper outlet header 24 and 24'. From header 24 and 24' the preheated water is conducted to the bottom of the next adjacent panels 2 and 2' by downcomer pipes 26 and 26'. After passing upwards through the tubes of the second panels 2 and 2', the flow is again collected into a downcomer pipes 28 and 28' and introduced into the bottom of the third panels 3 and 3'. This process is repeated in the manner described for panels 4, 5, 6, and 4', 5', and 6' which constitute the boiler section of the steam generator. Downcomers 30 and 30' from panels 7 and 7' respectively feed the inlets of two adjacent panels in a parallel manner; namely, panels 8 and 9 for the first flow path and 8' and 9' for the second flow path. These panels are designated as the primary superheater panels of the solar steam generator assembly 16. Steam exiting from panels 8, 9 and 8', 9' are passed through respective spray attemperators 32 and 32'. The steam is conducted to the attemperators 32 and 32' from respective panels 8, 9 and 8', 9' by respective lines 34, 36 and 34', 36'.

At the attemperators 32 and 32', additional feedwater is injected as required to control the final steam temperature. The attemperated steam exits the attemperators 32 and 32' through tubes 38 and 38' to feed the bottoms of panels 10, 11, 12 and 10', 11', 12' respectively which panels are designated as the secondary superheater panels of the solar steam generator assembly 16. The superheated steam from the secondary superheater panels is individually supplied along lines 40, 42, 44, and 40', 42', and 44' to collecting pipes 46 and 46' having nonreturn valves 48 and 48' mounted therein and leading to a turbine (not shown). Bypass lines 50 and 50' are connected to lines 46 and 46' respectively to lead to a flash tank 52 used for start-up operation, shutdown operation, and derated conditions operation. The flash tank 52 is designed for full pressure (approximately 1600 psi). Steam from the flash tank 52 is discharged into a thermal storage or condenser area via line 54.

Figure 5:
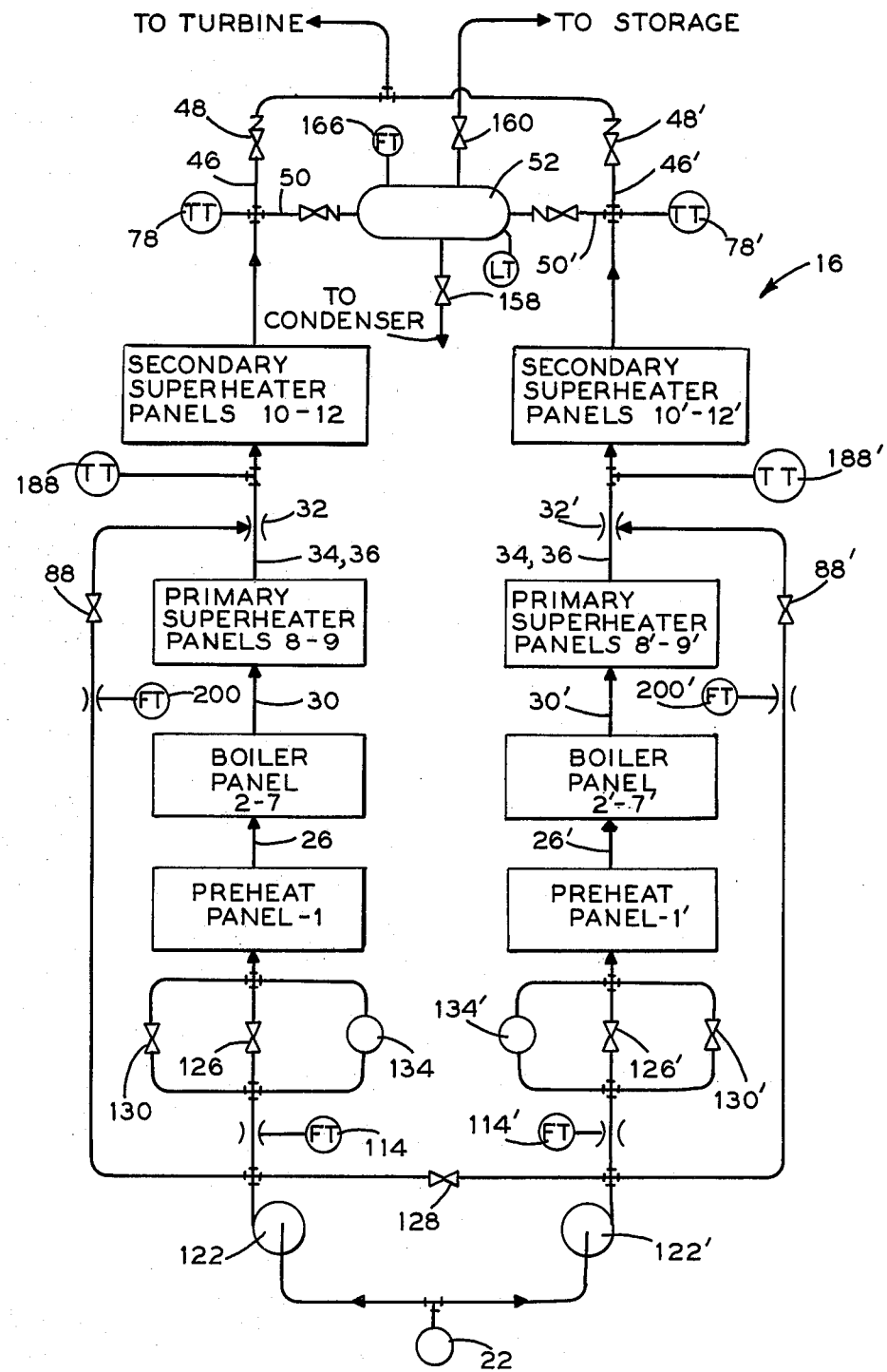
FIG. 5 is a flow diagram for the solar-heated boiler control of the present invention.
Figure 6:
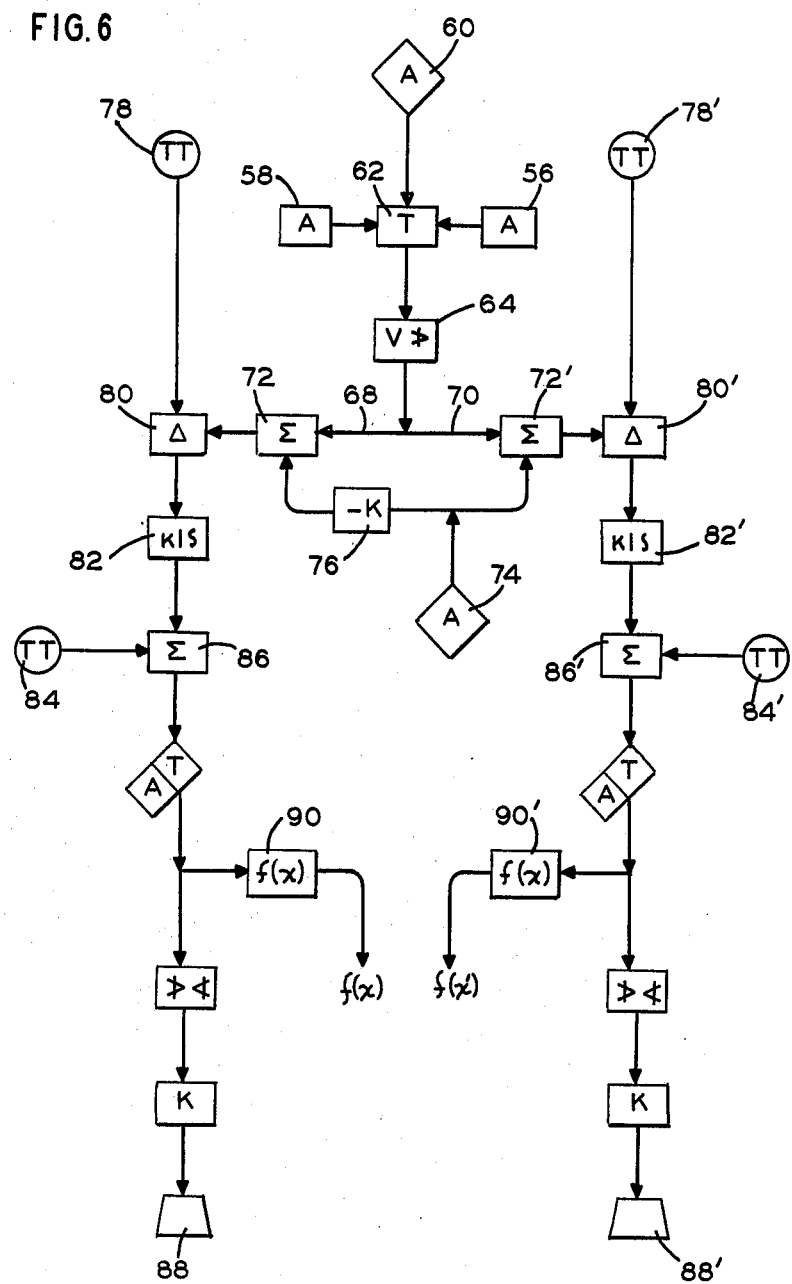
FIG. 6 is a schematic of the steam temperature control part of the boiler control of FIG. 5.
Figure 7:
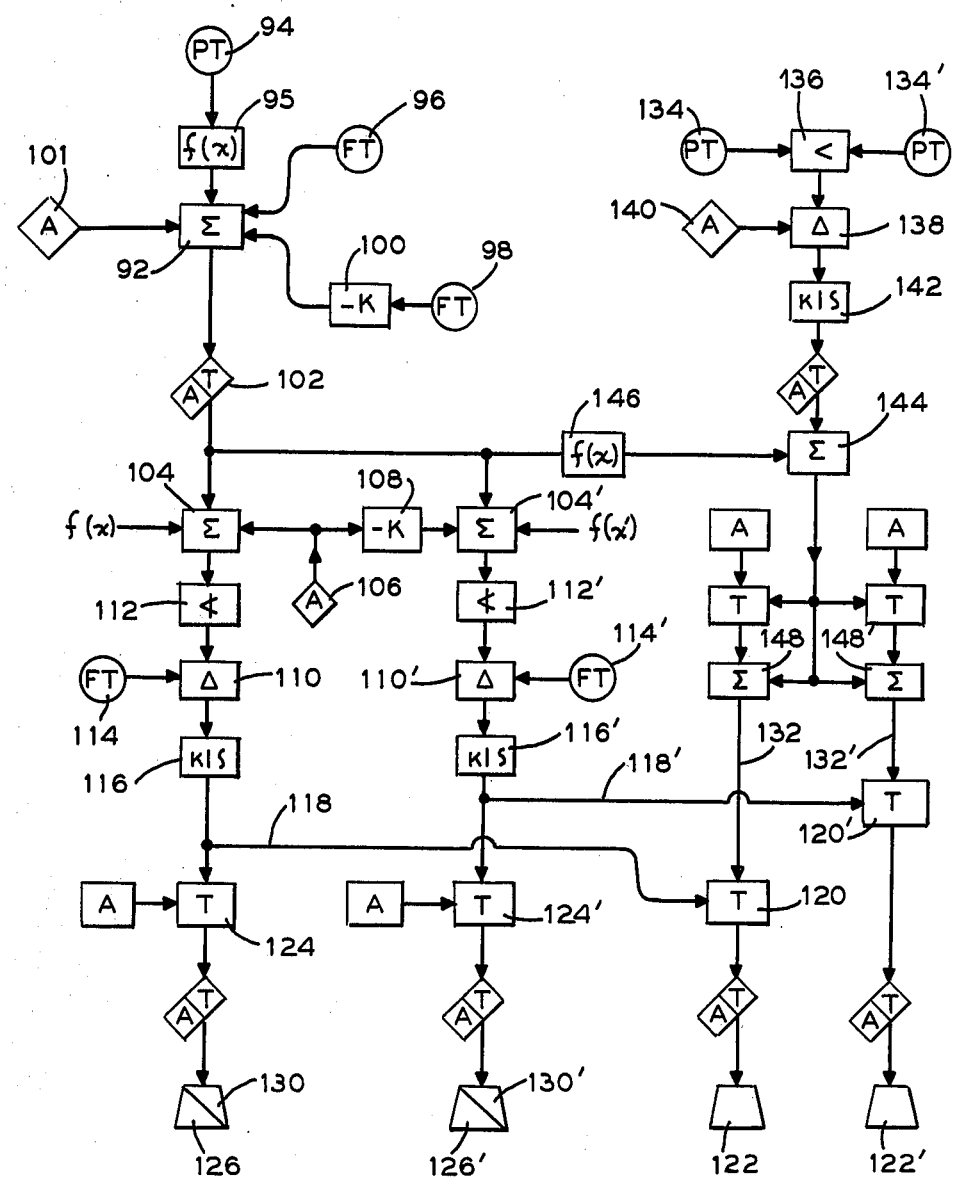
FIG. 7 is a schematic of the feedwater control part of the boiler control of FIG. 5.

Referring now to FIGS. 5 through 7, it will be seen that the steam temperature exiting from lines 48 and 48' to the turbine is controlled to a common set point by a combination of water attemperation at the primary superheater panel outlets 34, 36 and 34', 36' and control of feedwater flow through the two individual flow paths defined by panels 1-12 and 1'-12'.

With particular reference to FIGS. 5 and 6, it will be seen that the outlet temperature of the steam from lines 48 and 48' is set between three set point values depending upon the required operating mode for the solar steam generator 16. These three set point values are an initial value set point 56 used during start-up or shutdown of the boiler, a derated steam temperature set point 58 used when the steam flow from the solar steam generator 16 is going to storage, and a rated steam temperature set point 60 used when the stem flow is going to the turbine. The three mentioned set points 56, 58 and 60 are connected to a transfer station 62 which selects the desired set point and communicates it to a velocity limiter 64 which provides a linear ramp as a function of time of the selected set point when a transfer is made by the transfer station 62 between any of the set points 56, 58, or 60. This linear ramp minimizes any "bump" during transfer which may adversely affect the operation of the control system. Other means such as a restive capacitive combination could be placed in the present circuit to replace the velocity limiter in the present circuit or any other circuits. The set point signal from the velocity limiter 64 is sent along two paths 68 and 70 to summing stations 72 and 72'. A steam bias signal station 74 provides a steam bias signal to the summing station 72' and the negative of that signal to the summing station 72 by virtue of the inverter station 76 being connected between the summing station 72 and the steam bias signal station 74.

The biased set point signal from stations 72 and 72' is compared with the outlet temperature of the secondary superheater panels 10-12 and 10'-12' by temperature sensors 78 and 78' which respectively sense the superheated steam in the flow paths defined by panels 1-12 and 1'-12'. This comparison is made in stations 80 and 80' with any difference or error signal being transmitted to a proportional plug integral controller 82 and 82'. The output of the controllers 82 and 82' is summed with the temperature measurements of the attemperator 32, 32' outlet temperature sensed by temperature sensors 84 and 84' in summing stations 86 and 86'. The sum of these two temperature signals generates an attemperator flow demand signal which is split-ranged. The mid-range of this signal is used to position the attemperator flow control valve 88 and 88' while the high and low ranges of the flow demand signal are used to bias the feedwater flow through the affected flow path up or down as required by the function f(X) generated at stations 90 and 90'. The operation of this feedwater flow bias will be explained in the following description with particular reference to FIGS. 6 and 7.

The total feed forward demand for boiler feedwater flow is generated as a function of total steam flow from the solar steam generator 16. Total steam flow is calculated from the sum of turbine steam flow as measured by the turbine first-stage pressure and steam flow to storage less the steam flow from storage to the turbine. To provide the proper signal including the three forementioned variables, a summing station 92 accepts signals from a turbine pressure measuring device 94 which signal is converted to a steam flow signal by the function generator 95 and adds it to a flow measuring signal transducer 96 which measures the flow of steam to storage. A flow measuring transducer 98 measures the flow of steam from storage to the turbine and this signal is converted to the negative at inverter station 100 before it is supplied to the summing station 92. This signal of total steam flow required may be biased by a signal from a hand-operated station 101 before it is supplied through a hand/auto station 102 to a pair of summing stations 104 and 104' where it is summed with the temperature bias signals f(X) and f(X') respectively derived from the attemperation control of FIG. 6. A positive feedwater bias signal is also applied to summing station 104 from a bias station 106 while the negative feedwater bias signal is applied to the summing station 104' by having the signal from the bias station 106 go through an inverter station 108 before it reaches the summing station 104'. The signals from summing stations 104 and 104' indicative of total feedwater flow requirement are transmitted to comparison stations 110 and 110' respectively through associated flow limit stations 112 and 112' which insure a minimal limit always be included in the system for flow demand insuring adequate flow for protection of the boiler tubes during start-up of the solar steam generator 16. At the comparison stations 110 and 110' the signals indicative of total feedwater flow demand are compared with actual flow of feedwater signals for the flow paths 1-12 and 1'-12' by having flow signals from flow meters 114 and 114' transmit their signals to the comparison stations 110 and 110' respectively. Thus, the comparison stations 110 and 110' develop an error signal of the difference between actual feedwater demand and actual feedwater flow in the respective flow paths 1-12 and 1'-12' which error signals are transmitted respectively to proportional integral controllers 116 and 116'. The outputs of the proportional integral controllers 116 and 116' are transmitted along lines 118 and 118' to associated transfer stations 120 and 120' which control the speed of pumps 122 and 122' supplying feedwater flow to paths 1-12 and 1'-12' respectively. The signal from the controllers 116 and 116' is also transmitted to transfer stations 124 and 124' which control high volume ON/OFF valves 126 and 126' to be fully opened allowing unrestricted flow of feedwater from pumps 122 and 122' through flow paths 1-12 and 1'-12' respectively. Control valves 130 and 130' are also fully opened but could be closed without significantly affecting the flow of feedwater through paths 1-12 and 1'-12'. Thus, during normal operation the amount of feedwater flow supplied to the flow paths 1-12 and 1'-12' is controlled exclusively by the speed of the associated flow path pumps 122 and 122'.

Should operation be required with one of the pumps 122 or 122' out of service, an isolation valve 128 shown in FIG. 5, which is normally closed will be opened to allow the remaining operating pump to supply both the flow paths 1-12 and 1'-12'. During this type of single pump operation the speed of the single pump will be varied according to a feedwater flow signal which is derived in a manner to be explained later while the control of the amount of flow through the individual paths 1-12 and 1'-12' will be controlled by control valves 130 and 130'.

In single pump operation the error signals from proportional integral controllers 116 and 116' will be transferred by the transfer stations 124 and 124' to modulate the pump valves 130 and 130' respectively. The same transfer stations 124 and 124' will also shut off valves 126 and 126'. At this point, it should be mentioned that the valves 126 and 126' are high volume ON/OFF valves as opposed to the control valves 130 and 130' which are more delicate and provide better controllability than attempting to use the valves 126 and 126' in both an ON/OFF as well as a control function.

Turning to the control of the speed of pumps 122 and 122', it will be appreciated that the transfer stations 120 and 120' block the control signals from lines 118 and 118' and instead select signals from lines 132 and 132'. The signals from the lines 132 and 132' are feedwater flow demand signals which are developed as follows. The pressure drop across control valves 130 and 130' is respectively measured by ΔP transmitters 134 and 134', their signals being supplied to a low select station 136 which selects the lower of the two ΔP signals and supplies the selected signal to a comparison station 138 which compares the forementioned signal with a ΔP set point provided by station 140. The error signal developed by the comparison station 138 is transmitted to a proportional integral controller 142 with the signal therefrom being supplied to a summing station 144. The summing station 144 sums the forementioned signal with the total feedwater flow demand signal from summing station 92 which is converted to a feed pump speed demand signal by the function generator 146 prior to supplying the signal to the summing station 144. The signal from the summing station 144 is supplied to the transfer stations 120 and 120' through summing stations 148 and 148' respectively where this signal is supplied to the operating pump 122 or 122' to control the speed thereof.

Figure 8:
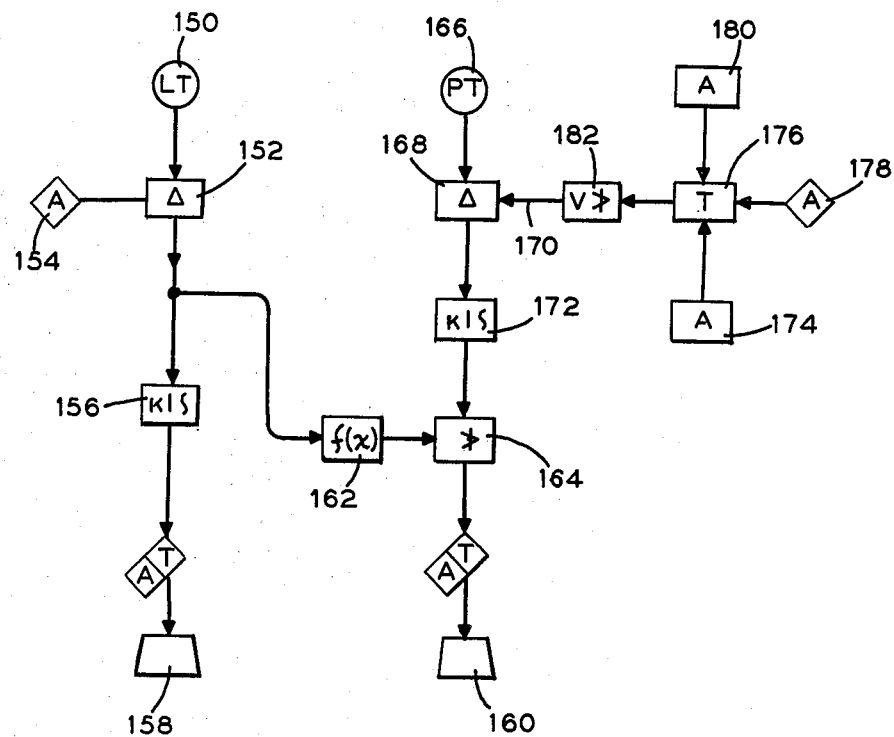
FIG. 8 is a schematic of the flash tank control part of the boiler control of FIG. 5.

Turning next to FIGS. 5 and 8, it will be seen that the operation of the flash tank 52 is controlled as follows. The water level in the flash tank is measured by a level transmitter 150 whose signal is supplied to a comparison station 152 which compares the forementioned signal with a water level set point signal supplied to the comparison station 152 from a set point station 154. The resulting error signal developed by the comparison station 152 is applied to a proportional plus integral controller 156 which controls the flash tank level control valve 158. During the initial portion of the start-up cycle, the flash tank 52 high level is used to keep the flash tank pressure control valve 160 closed by providing the error signal from the comparison station 152 to a function generator 162 which supplies the error signal to a level override station 164 to keep the valve 160 closed.

As pressure in the flash tank 52 builds up, it is sensed by a pressure transmitter 166 with the signal therefrom being transmitted to a comparison station 168 which compares the mentioned signal to a set point signal transmitted along line 170. The error signal from the comparison station 168 is applied to a proportional integral controller 172 which controls the flash tank pressure control valve 160.

The flash tank pressure set point is established as necessary for the various operating modes. An initial pressure set point from station 174 is selected by the transfer station 176 during start-up until the derated temperature set point is achieved at the boiler outlet or during a shutdown after the derated temperature set point is no longer maintainable. Once steam conditions are such that the derated temperature set point is achieved, the flash tank 52 pressure set point will be transferred by the transfer station 176 to the normal operating pressure set point from station 178. Once sufficient steam flow is being taken off the main steam line that boiler pressure control is transferred to either the turbine valve or to the discharge valve from main steam line to storage, the flash tank 52 pressure set point is transferred by transfer station 176 to an overpressure set point from station 180 so that the flash tank pressure control valve does not interact with the normal pressure control. A velocity limiter 182 is used to provide a linear ramp of the flash tank pressure set point as a function of time when transferring between set point valves to minimize bumping during such transfers.

At this stage, we will discuss the operation of the solar steam generator. Under normal conditions the solar steam generator 16 will stand by overnight with the boiler stop valves closed and the boiler filled with water, circulating as necessary to prevent freezing in the boiler. When start-up of the boiler is initiated, a feed pump 122 or 122' or both will be placed in service and minimum boiler feedwater flow will be established through the boiler and flash tank 52. The flash tank 52 will probably be flooded at this time with the flash tank level control valve 158 wide open with all drains going to the condenser. Once minimum flow is established through the boiler, the boiler is ready for solar radiation.

As the fluid temperature rises a level will be established in the flash tank 52 with the flash tank level control valve 158 modulating to maintain flash tank 52 level at set point. As the flash tank level comes within limits, the flash tank pressure control valve 160 will be released to control flash tank pressure to the initial pressure set point. Flash tank steam at this time will also be going to the condenser. Once the outlet steam temperature in either boiler flow path 1-12 or 1'-12' reaches the initial temperature set point, the steam temperature set point will be ramped to the derated steam temperature set point and the steam temperature control on feedwater flow and water attemperator flow will be released. Bypass steam around the boiler stop valves will then be used to preheat the main steam line. When the outlet steam temperatures in either boiler flow path 1-12 or 1'-12' reaches the derated steam temperature set point, the set point for flash tank pressure will be ramped to the turbine rolling pressure. When the flash tank pressure reaches the rolling pressure, the boiler stop valve on the first boiler to reach temperature will be opened and turbine rolling initiated. Flash tank steam may be taken to storage. The boiler stop valves may be opened at this time on either boiler when its outlet steam temperature reaches the derated value. The steam flow from the boilers to the turbine may be directed to storage as well as to the turbine. When sufficient steam flow is established in the main steam line, boiler pressure control is transferred either to the storage system or to the turbine control valve and the flash tank pressure set point is transferred to an overpressure valve to force the flash tank pressure control valve closed.

When the turbine has been synchronized and the initial load applied with steam supplied by either or both boilers, the steam temperature will be slowly ramped to its rated value. The steam pressure set point, with the pressure controlled by the position of the turbine control valves, will be ramped up to the operating pressure dependent on the supply of steam from both boilers.

Figure 9:
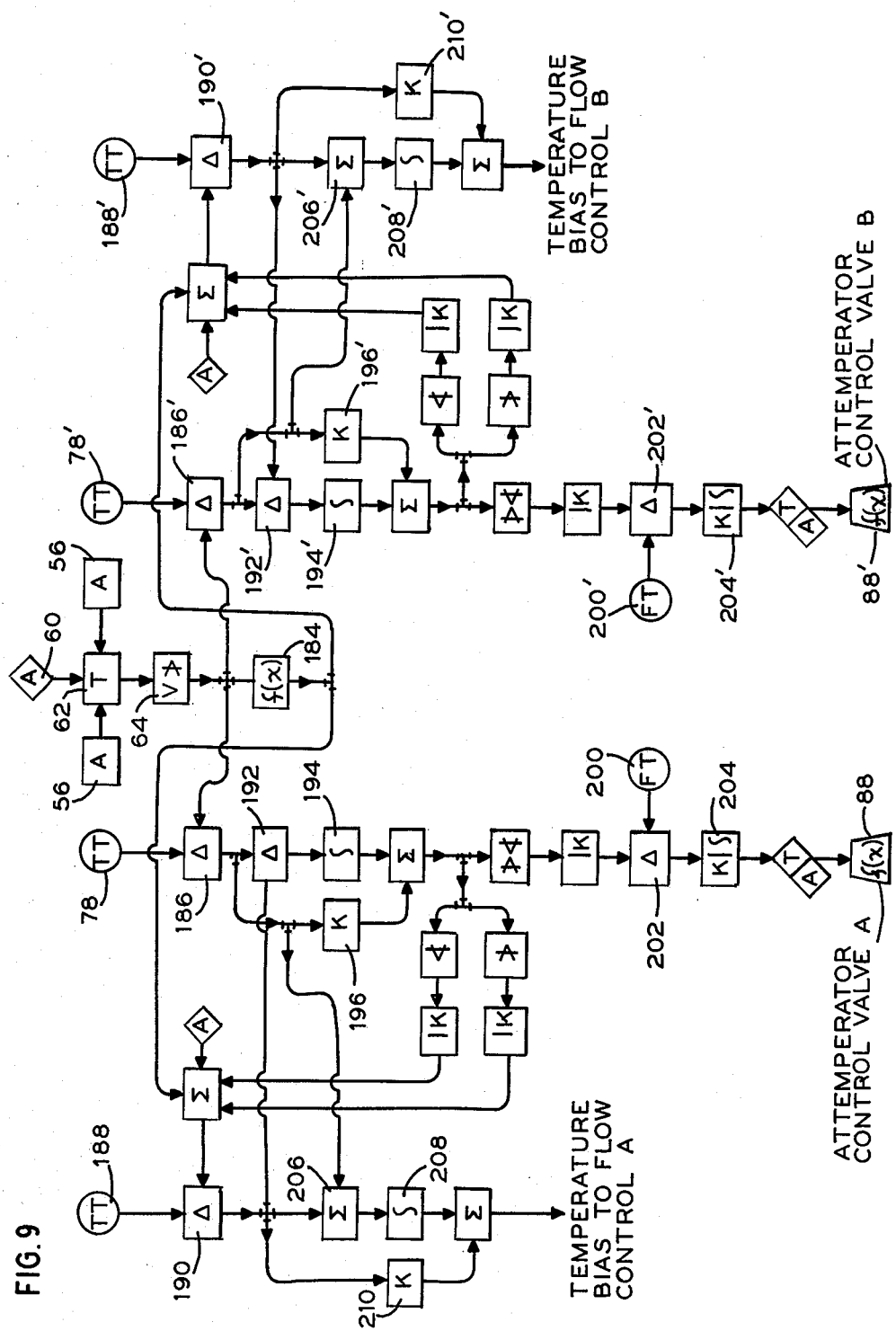
FIG. 9 is a schematic of an alternate steam temperature control system.

Turning now to FIGS. 5 and 9, an alternate attemperation control system is disclosed for independently controlling the two flow paths 1-12 and 1'-12' to a common set point by a combination of water spray attemperation at the primary superheater outlet and control of feedwater flow through the boiler. As in the control system of FIG. 6, the secondary superheater outlet temperature set point is transferred between three values depending upon the required operating mode. These three values correspond to an initial temperature for start-up or shutdown, a derated steam temperature set point when the steam flow may be introduced to the turbine and a rated steam temperature set point when the steam flow is going to the turbine. These three set points are obtained from the stations 56, 58, and 60 and are selected by the transfer station 62 and ramped through the velocity ramp station 64.

The set point for the secondary superheater outlet temperature is also supplied to a function generator 184 which develops a set point for primary superheater temperatures as a function of the secondary superheater outlet temperature set point.

The secondary superheater outlet temperatures are measured by temperature transmitters 78 and 78' which supply their signals to a comparison station 186 and 186' which compare the secondary superheater outlet temperatures to the set point provided from the velocity limiter 64. Similarly, primary superheater outlet temperatures are measured by temperature transmitters 188 and 188' and are transmitted to comparison stations 190 and 190' where these measured signals are compared to the set point developed by the function generator 184.

The secondary superheater outlet temperature error developed by the comparison stations 186 and 186' and the primary superheater outlet temperature error supplied from the comparison stations 190 and 190' are transmitted to comparison stations 192 and 192' where the two signals are subtracted and applied to integral controllers 194 and 194'. The outputs of the controllers 194 and 194' are summed with the outputs of proportional controllers 196 and 196' operated on secondary superheater outlet temperature error signals provided by the comparison stations 186 and 186'. Thus the summing stations 198 and 198' establish secondary superheater outlet temperature control signals. These signals are split-ranged with the middle portion of the signal establishing a demand for attemperator flow. The attemperator flow demand signal is compared with the measured attemperator flow from flow meters 200 and 200' in comparison stations 202 and 202' to produce error signals which are applied to proportional plus integral controllers 204 and 204' which control the attemperator valves 88 and 88'.

As the attemperator flow demand approaches its maximum or minimum limits the split-range control will bias the primary superheater temperature set point down if the attemperator demand is approaching its maximum limit or up if the attemperator demand is reaching its minimum limit. This will effect the transfer of steam temperature control from the attemperator to the feed water flow.

The primary superheater outlet temperature error from comparison stations 190 and 190' is summed with the secondary superheater outlet temperature error from comparison stations 186 and 186' in summing stations 206 and 206' and applied to integral controllers 208 and 208'. The output of these controllers is summed with the output of proportional controllers 210 and 210' on primary superheater outlet temperature error, the outputs of which are used to bias the feedwater flow for the appropriate boiler path. If the primary and secondary superheater temperatures are in error in the same direction, an unbalance exists between solar heat flux and feedwater flow and the integral correction will bring feedwater flow back into line with the incident solar heat flux. If the temperature errors are in opposite directions, an unbalance exists between the solar heat flux being received by the primary and secondary superheater panels and the integral correction will compensate for this unbalance by adjusting the attemperator flow. The proportional correction is used to limit the temperature transients while the slower integral correction is occurring.

Certain modifications and improvements have been deleted herein for the sake of conciseness and readability but are properly included within the scope of the following claims.

I claim:

1. A control system having a solar steam generator comprising:

a series of solar-heated panels connected together to allow fluid flow therethrough, said series of panels forming a boiler section, a primary superheater section, and a secondary superheater section of a boiler assembly;

first means for measuring the temperature of the fluid at the outlet of the secondary superheater section and establishing a signal indicative thereof;

second means for measuring the temperature of the fluid at the outlet of said primary superheater section and establishing a signal indicative thereof;

means for controllably adding attemperation fluid into said secondary superheater section of said series of solar-heated panels;

a set point station establishing a signal indicative of desired fluid temperature exiting from said series of solar-heated panels;

a comparison station for comparing the signal from said set point station with the signal from said first temperature measuring means to establish an error signal indicative of any difference between the compared signals; and a summing station for adding the error signal from said comparison station to the signal from said second temperature measuring means to establish a control signal for controlling said attemperation means.

2. A control system as set forth in claim 1 wherein said attemperation means includes:
a fluid line for providing attemperating fluid flow into the outlet of said primary superheater section prior to said second temperature measurement means; and
a control valve mounted into said fluid line to vary the flow of fluid therein in response to said control signal from said summing station.

3. A control system as set forth in claim 1 including a second series of solar-heated panels identical to said first series of panels and having temperature measuring means, attemperation means, and combining means substantially identical to said first series of panels.

4. A control system for a solar steam generator comprising:

a series of solar-heated panels connected together to form a steam generating assembly allowing fluid flow therethrough;
first means for measuring the temperature of the fluid at one point of said steam generating assembly and comparing the measured temperature with a set point temperature to provide a temperature difference control signal;
second means for measuring the temperature of the fluid at another point of said steam generating assembly and establishing a second control signal;
attemperation means for controllably adding attemperation fluid into said steam generating assembly; and
first means for adding the control signals of said first and second measuring means to establish a fluid control signal for controlling the amount of flow through said attemperation means.

* * * * *